United States Patent
Li et al.

(10) Patent No.: US 10,091,118 B2
(45) Date of Patent: Oct. 2, 2018

(54) MAXIMIZING THROUGHPUT OVER A TCP LINK BY BOOSTING PACKET TRANSMISSION

(71) Applicant: Verizon Patent and Licensing Inc., Arlington, VA (US)

(72) Inventors: Feng Li, Lexington, MA (US); Jae Won Chung, Lexington, MA (US); Eduard Rubinshtein, Belmont, MA (US); Haim S. Ner, Fair Lawn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 79 days.

(21) Appl. No.: 15/418,206

(22) Filed: Jan. 27, 2017

(65) Prior Publication Data
US 2018/0219786 A1    Aug. 2, 2018

(51) Int. Cl.
| | | |
|---|---|---|
| *H04L 12/16* | (2006.01) | |
| *H04L 12/807* | (2013.01) | |
| *H04W 28/02* | (2009.01) | |
| *H04L 12/841* | (2013.01) | |

(52) U.S. Cl.
CPC ........... *H04L 47/27* (2013.01); *H04L 47/283* (2013.01); *H04W 28/0273* (2013.01); *H04W 28/0289* (2013.01)

(58) Field of Classification Search
CPC ...................................... H04L 47/10
USPC ........................................ 370/330
See application file for complete search history.

(56) References Cited

U.S. PATENT DOCUMENTS

| | | | | |
|---|---|---|---|---|
| 2003/0147403 A1* | 8/2003 | Border | ................. | H04L 12/4641 370/395.53 |
| 2005/0063302 A1* | 3/2005 | Samuels | ................. | H04L 41/00 370/229 |
| 2010/0329117 A1* | 12/2010 | Lee | ..................... | H04B 7/18586 370/235 |
| 2013/0114408 A1* | 5/2013 | Sastry | ................... | H04W 28/02 370/231 |
| 2014/0185453 A1* | 7/2014 | Hwang | ............... | H04L 43/0864 370/236 |
| 2015/0188830 A1* | 7/2015 | Zhao | ........................ | H04L 47/27 370/235 |
| 2015/0271225 A1* | 9/2015 | Mao | ........................ | H04L 47/27 709/219 |

OTHER PUBLICATIONS

Wikipedia, "TCP Congestion Control," https://en.wikipedia.org/wiki/TCP_congestion_control, Jan. 19, 2017, 13 pages.

* cited by examiner

*Primary Examiner* — Shripal Khajuria

(57) ABSTRACT

A device can transmit, to a transmission control protocol (TCP) receiver, a quantity of packets based on a congestion window (CWND) value. The device can receive, from the TCP receiver, a quantity of acknowledgement (ACK) packets, that include a corresponding quantity of advertised receive window (RWND) values, based on transmitting the quantity of packets. The device can determine a maximum value for an updated CWND based on the CWND value and the corresponding quantity of RWND values. The device can provide a quantity of additional packets, to the TCP receiver, based on the maximum value for the updated CWND to cause the TCP receiver to selectively increase a size of a receive buffer.

20 Claims, 5 Drawing Sheets

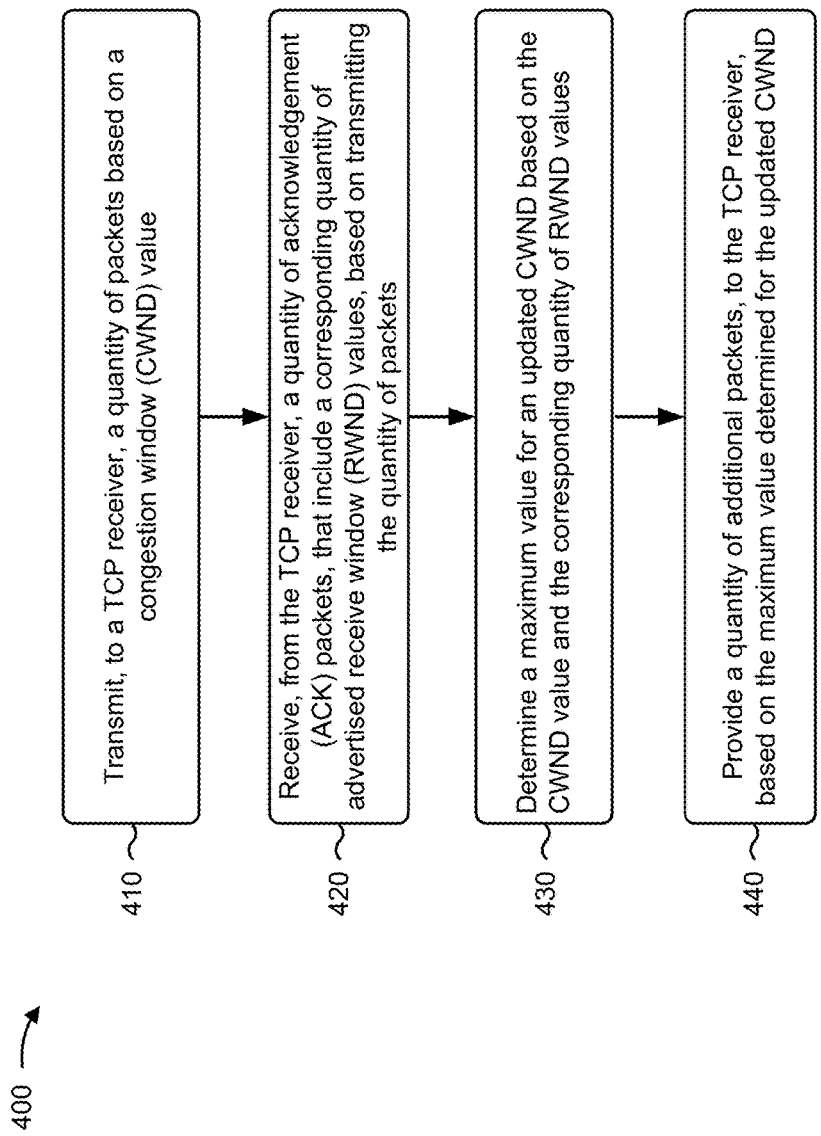

MAXIMIZING THROUGHPUT OVER A TCP LINK BY BOOSTING PACKET TRANSMISSION

BACKGROUND

In the Transmission Control Protocol (TCP), a congestion window is a flow control mechanism that is based on a network capacity and/or a network loading condition. The congestion window can prevent a link between a server device and a client device from becoming overloaded with network traffic. Additionally, the congestion window can be calculated based on estimating congestion between the server device and the client device.

BRIEF DESCRIPTION OF THE DRAWINGS

FIG. 4 is a flow chart of an example process for maximizing throughput over a TCP link by boosting a congestion window (CWND) value of a TCP sender and a receive window buffer (RWIN) of a TCP receiver.

DETAILED DESCRIPTION OF PREFERRED EMBODIMENTS

The following detailed description of example implementations refers to the accompanying drawings. The same reference numbers in different drawings can identify the same or similar elements.

In wireless networks, particular TCP congestion-avoidance algorithms employ an initial slow start algorithm to probe network congestion before full speed transmission occurs. The initial slow start algorithm increases (e.g., doubles) a congestion window (CWND) for every round trip time (RTT) until packet loss is detected, an advertised receive window (RWND) is reached, or a slow start threshold is reached. In some cases, the slow start algorithm can begin with a congestion window size of one, two, or ten packets. However, in high speed TCP links (or in high capacity networks), this approach can cause the network to underutilize the network speed (or network capacity), and can further underutilize the TCP receive window buffer (RWIN) during the first few iterations of the slow-start algorithm.

Implementations described herein implement a TCP congestion-avoidance algorithm over a TCP flow that allows a TCP sender to accelerate the Slow Start process (or the CWND growth, or the throughput speed) by setting the CWND to a value equal to a maximum RWND received by an acknowledgement (ACK) packet instead of using the Slow Start algorithm. By setting the CWND value to the maximum RWND value received by an ACK packet, the TCP sender efficiently utilizes the RWIN of the TCP receiver by providing enough packets to fill the RWIN on the next transmission, causing the TCP receiver to increase (e.g., double) the RWIN to create additional buffer space. Furthermore, increasing the CWND and the RWIN accelerates the Slow Start process and increases overall throughput performance over the TCP link.

Figure 1A:
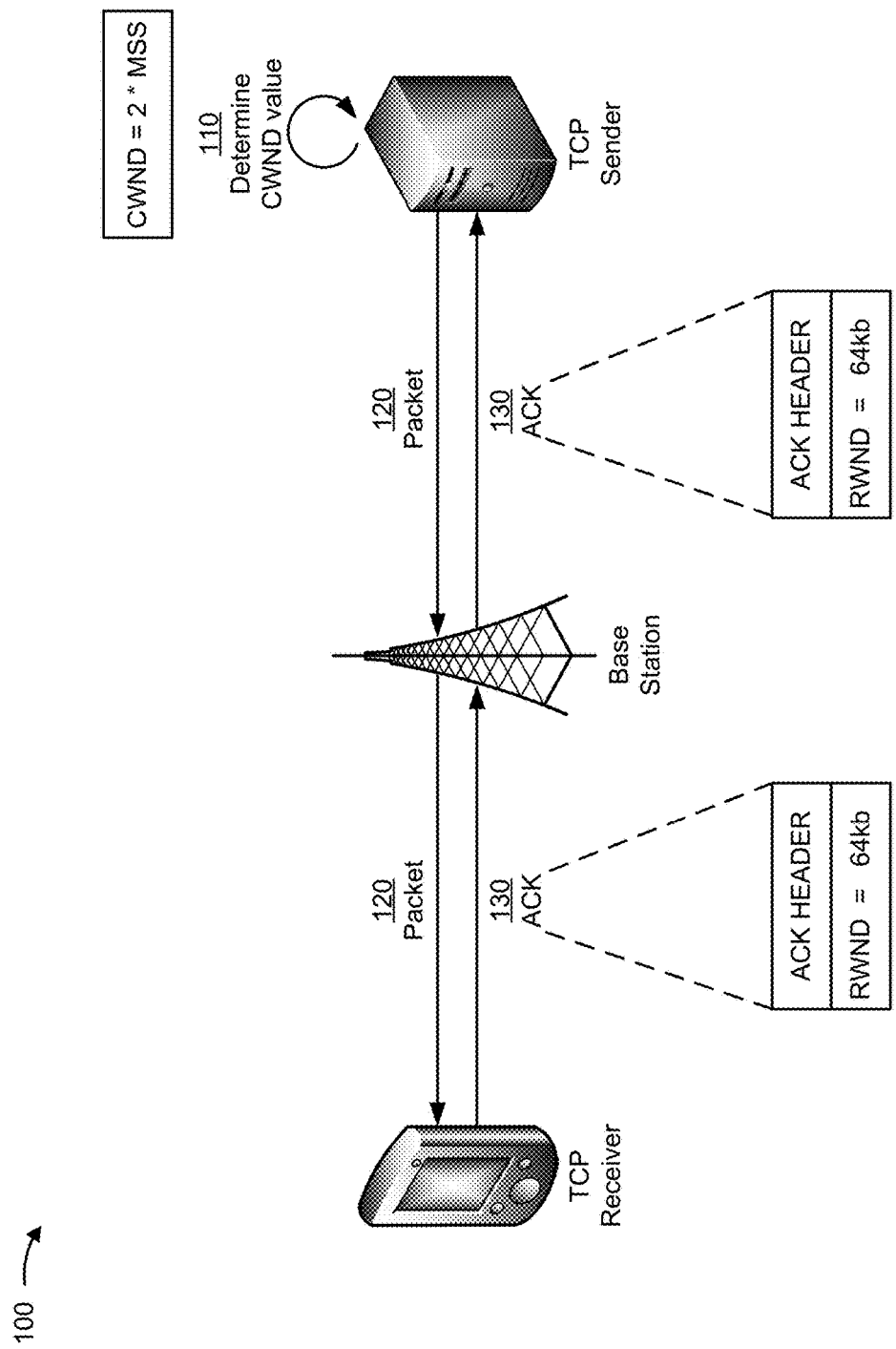
FIGS. 1A and 1B are diagrams of an overview of an example implementation described herein.
Figure 1B:
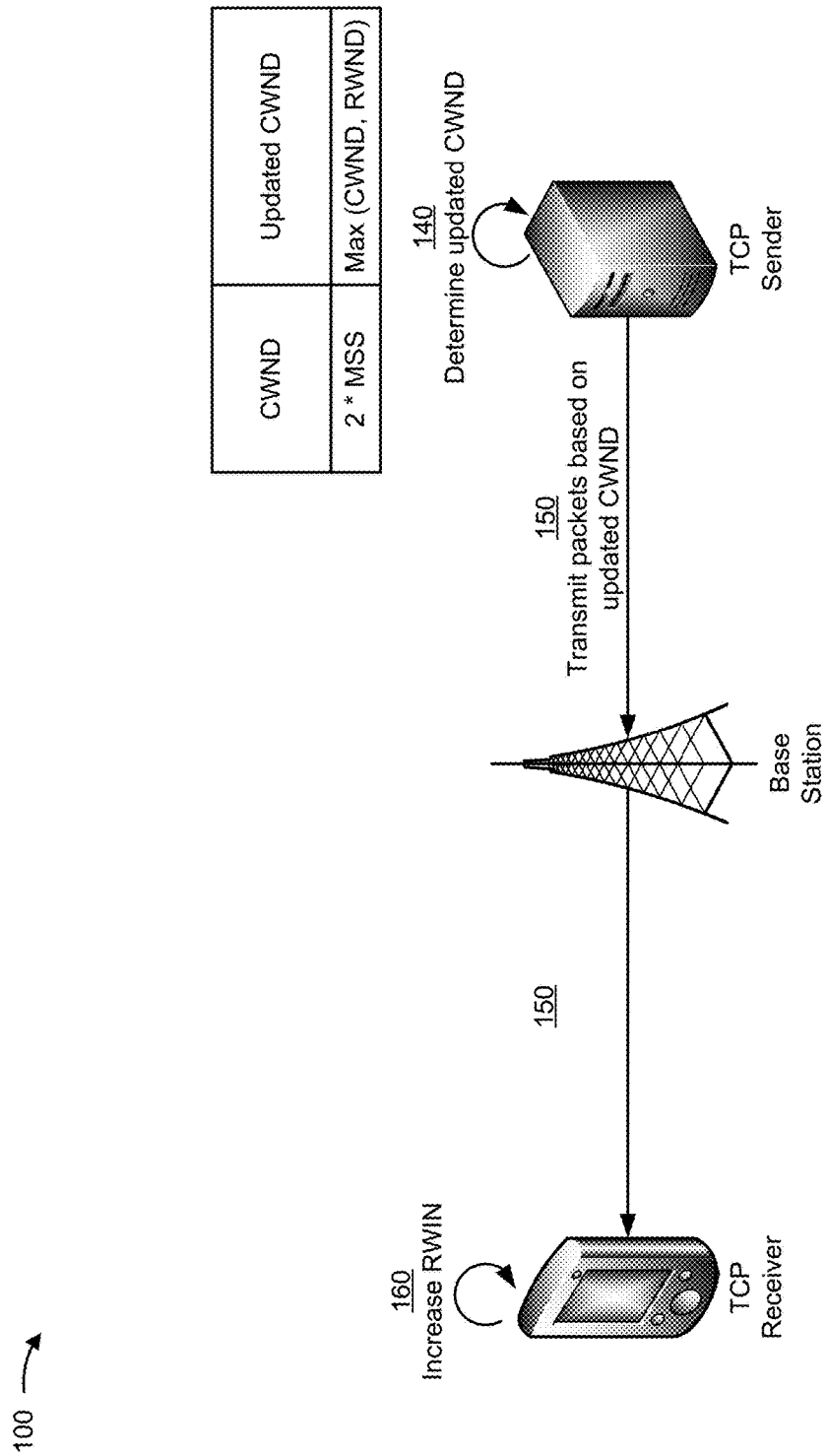

FIGS. 1A-1B are diagrams of an overview of an example implementation 100 described herein. For FIGS. 1A-1B, assume a TCP flow is established between a TCP receiver and a TCP sender, using a base station as an intermediary. Further assume the TCP sender and/or the TCP receiver manage traffic with a congestion-avoidance algorithm.

As shown in FIG. 1A, and by reference number 110, the TCP sender can determine a CWND value, and the CWND value can indicate a quantity of packets that the TCP sender can transmit. For example, the TCP sender can determine the CWND value during a "three-way-handshake" process with the TCP receiver (e.g., based on comparing timestamps associated with a synchronize (SYN) message, a synchronize-acknowledgement (SYN-ACK) message, and an acknowledgement (ACK) message). The three-way-handshake can include information indicating a maximum segment size (MSS), and the MSS can be used to determine the CWND value (e.g., the CWND value is shown as two times the MSS). As shown by reference number 120, the TCP sender can use the CWND value to transmit packets to the TCP receiver (e.g., a quantity of packets equal to two times the MSS), using the base station as an intermediary.

As shown by reference number 130, the TCP receiver can transmit ACK packets to the TCP sender, using the base station as an intermediary. The ACK packets can include an RWND value (e.g., shown in the ACK header as 64 kilobytes (Kb)), and the RWND value can indicate an amount of data available in a receiving window buffer (RWIN) of the TCP receiver. The RWND value can limit the amount of data that the TPC sender can transmit before needing to receive another acknowledgement.

As shown in FIG. 1B, and by reference number 140, the TCP sender can determine an updated CWND value, as the maximum of the CWND value and the corresponding quantity of RWND values. For example, the TCP sender can compare the CWND value and the RWND values, and can set the updated CWND value to a value equal to the maximum value found. In this case, the CWND value (e.g., 2*MSS) can be lower than the RWND values (e.g., due to the RWIN having a lot of remaining space), which can result in the updated CWND value being set to a value equal to the maximum RWND value.

As shown by reference number 150, the TCP sender can transmit, to the TCP receiver, an additional quantity of packets, based on the updated CWND value, where the additional quantity of packets is a larger quantity than the packets associated with the CWND value. In this case, the additional quantity of packets can fill the RWIN of the TCP receiver, which, as shown by reference number 160, can cause the TCP receiver to increase a size of the RWIN.

By setting the updated CWND value to the largest RWND value, the TCP sender is able to increase throughput over the TCP flow. In addition, increasing a quantity of packets to transmit to the TCP receiver causes the TCP receiver to increase a size of (e.g., double) the RWIN, which maximizes utilization of the RWIN by filling the RWIN shortly after the TCP flow is established.

As indicated above, FIGS. 1A and 1B are provided merely as an example. Other examples are possible and can differ from what was described with regard to FIGS. 1A and 1B.

Figure 2:
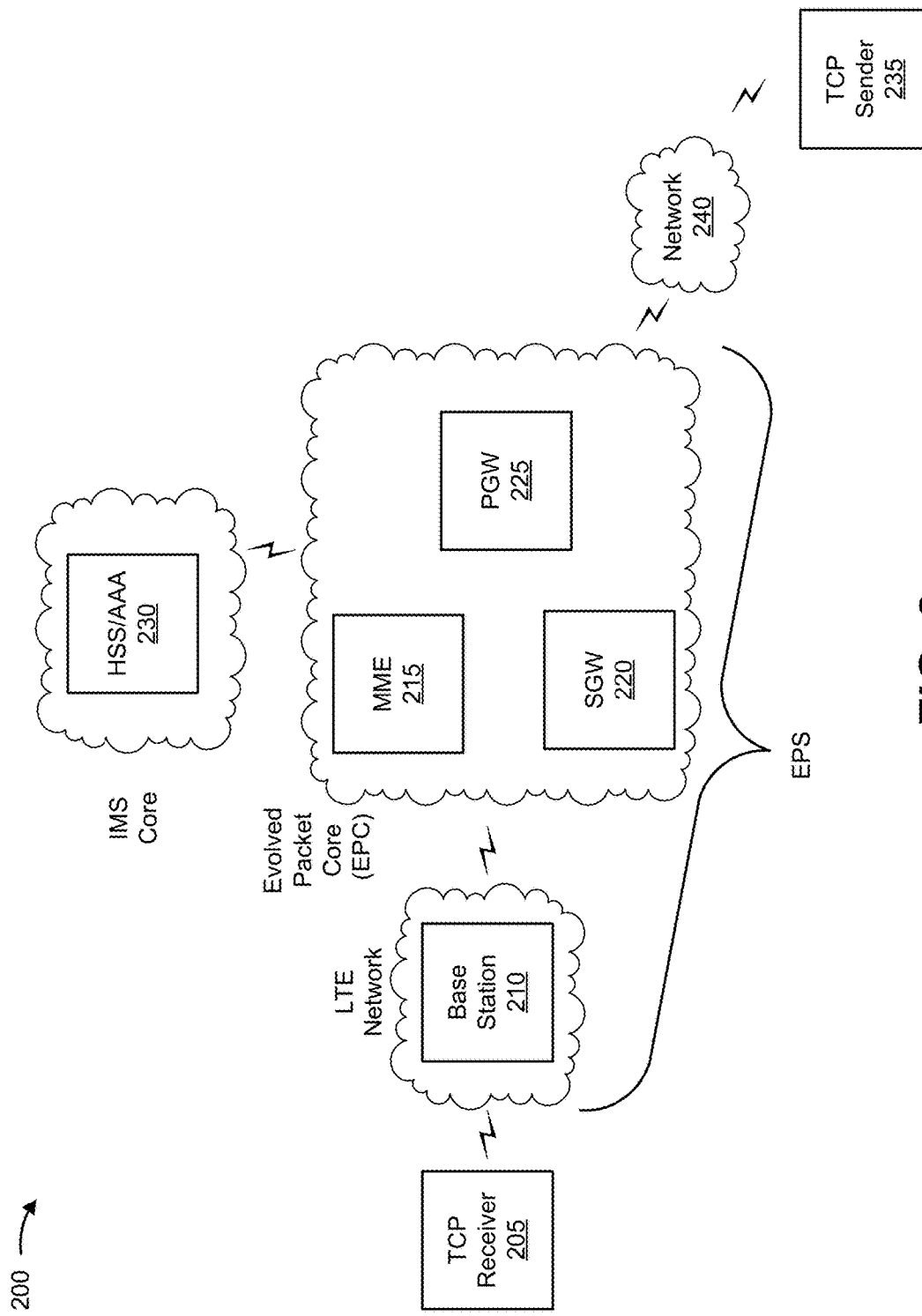
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a TCP receiver 205, a base station 210, a mobility management entity (MME) 215, a serving gateway (SGW) 220, a packet data network (PDN) gateway (PGW) 225, a home subscriber server/authentication, authorization, and accounting server (HSS/AAA) 230, a TCP sender 235, and a network 240. Devices of environment 200 can interconnect via wired connections, wireless connections, or a combination of wired and wireless connections.

Some implementations are described herein as being performed within a fourth generation (4G) long-term evolution (LTE) network for explanatory purposes. Some implementations can be performed within a network that is not an LTE network, such as a fifth generation (5G) network, a third generation (3G) network, or a code division multiple access (CDMA) network.

Environment 200 can include an evolved packet system (EPS) that includes an LTE network and/or an evolved packet core (EPC) that operate based on a 3GPP wireless communication standard. The LTE network can include a radio access network (RAN) that includes one or more base stations 210 that take the form of evolved Node Bs (eNBs) via which TCP receiver 205 communicates with the EPC. The EPC can include MME 215, SGW 220, and/or PGW 225 that enable TCP receiver 205 to communicate with network 240 and/or an Internet protocol (IP) multimedia subsystem (IMS) core. The IMS core can include HSS/AAA 230, and can manage device registration and authentication, session initiation, etc., associated with TCP receiver 205. HSS/AAA 230 can reside in the EPC and/or the IMS core.

TCP receiver 205 includes one or more devices capable of receiving, storing, processing, and/or providing packets. For example, TCP receiver 205 can include a communication device, such as a mobile phone (e.g., a smart phone or a radiotelephone), a tablet computer, a wearable communication device (e.g., a smart wristwatch or a pair of smart eyeglasses), a desktop computer, a server computer, or a similar type of device. In some implementations, TCP receiver 205 can transmit packets to and/or receive packets from network 240 via base station 210 (e.g., based on a radio access bearer between TCP receiver 205 and SGW 220). For example, as part of a TCP flow, TCP receiver 205 can receive one or more packets from TCP sender 235, and can transmit one or more ACK packets to TCP sender 235. In this case, the one or more ACK packets can include one or more corresponding RWND values.

Base station 210 includes one or more devices capable of transferring traffic (e.g., packets), such as audio, video, text, and/or other traffic, destined for and/or received from TCP receiver 205. In some implementations, base station 210 can include an eNB associated with the LTE network that receives traffic from and/or sends traffic to network 240 via SGW 220 and/or PGW 225. Additionally, or alternatively, one or more base stations 210 can be associated with a RAN that is not associated with an LTE network. Base station 210 can send traffic to and/or receive traffic from TCP receiver 205 via an air interface (e.g., a radio frequency (RF) signal). In some implementations, base station 210 can include a small cell base station, such as a base station of a microcell, a picocell, and/or a femtocell.

MME 215 includes one or more devices, such as one or more server devices, capable of managing authentication, activation, deactivation, and/or mobility functions associated with TCP receiver 205. In some implementations, MME 215 can perform operations relating to authentication of TCP receiver 205. Additionally, or alternatively, MME 215 can facilitate the selection of a particular SGW 220 and/or a particular PGW 225 to serve traffic to and/or from TCP receiver 205. MME 215 can perform operations associated with handing off TCP receiver 205 from a first base station 210 to a second base station 210 when TCP receiver 205 is transitioning from a first cell associated with the first base station 210 to a second cell associated with the second base station 210. Additionally, or alternatively, MME 215 can select another MME (not pictured), to which TCP receiver 205 should be handed off (e.g., when TCP receiver 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 220 can aggregate traffic received from one or more base stations 210 associated with the LTE network, and can send the aggregated traffic to network 240 (e.g., via PGW 225) and/or other network devices associated with the EPC and/or the IMS core. Additionally, or alternatively, SGW 220 can receive traffic from network 240 and/or other network devices, and can send the received traffic to TCP receiver 205 via base station 210. Additionally, or alternatively, SGW 220 can perform operations associated with handing off TCP receiver 205 to and/or from an LTE network.

PGW 225 includes one or more devices capable of providing connectivity for TCP receiver 205 to external packet data networks (e.g., other than the depicted EPC and/or LTE network), such as network 240. For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 240. Additionally, or alternatively, PGW 225 can receive traffic from network 240, and can send the traffic to TCP receiver 205 via SGW 220 and base station 210. PGW 225 can record data usage information (e.g., byte usage), and can provide the data usage information to HSS/AAA 230.

HSS/AAA 230 includes one or more devices, such as one or more server devices, capable of managing (e.g., receiving, generating, storing, processing, and/or providing) information associated with TCP receiver 205. For example, HSS/AAA 230 can manage subscription information associated with TCP receiver 205, such as information that identifies a subscriber profile of a user associated with TCP receiver 205, information that identifies services and/or applications that are accessible to TCP receiver 205, location information associated with TCP receiver 205, a network identifier (e.g., a network address) that identifies TCP receiver 205, information that identifies a treatment of TCP receiver 205 (e.g., quality of service information, a quantity of minutes allowed per time period, a quantity of data consumption allowed per time period, etc.), information that identifies whether TCP receiver 205 is associated with an RF access signaling usage control policy and/or an RF access signaling usage billing policy, and/or similar information. HSS/AAA 230 can provide this information to one or more other devices of environment 200 to support the operations performed by those devices.

Additionally, or alternatively, HSS/AAA 230 can perform authentication operations for TCP receiver 205 and/or a user of TCP receiver 205 (e.g., using one or more credentials), can control access, by TCP receiver 205, to a service and/or an application (e.g., based on one or more restrictions, such as time-of-day restrictions, location restrictions, single or multiple access restrictions, read/write restrictions, RF access signaling usage restrictions, etc.), can track resources consumed by TCP receiver 205 (e.g., a quantity of voice minutes consumed, a quantity of data consumed, a quantity of RF signals transmitted, a quantity of radio access bearers requested and/or established, etc.), and/or can perform similar operations.

TCP sender 235 includes one or more devices capable of receiving, storing, processing, and/or providing packets. For example, TCP sender 235 can include a server device (e.g., a host server, a web server, an application server, etc.), a cloud computing device, or a similar device. In some implementations, as part of a TCP flow, TCP sender 235 can use a CWND value to determine a quantity of packets to transmit to TCP receiver 205, and can receive ACK packets from TCP receiver 205.

Network 240 includes one or more wired and/or wireless networks. For example, network 240 can include a cellular network (e.g., a 5G network, a 4G network, such as a LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
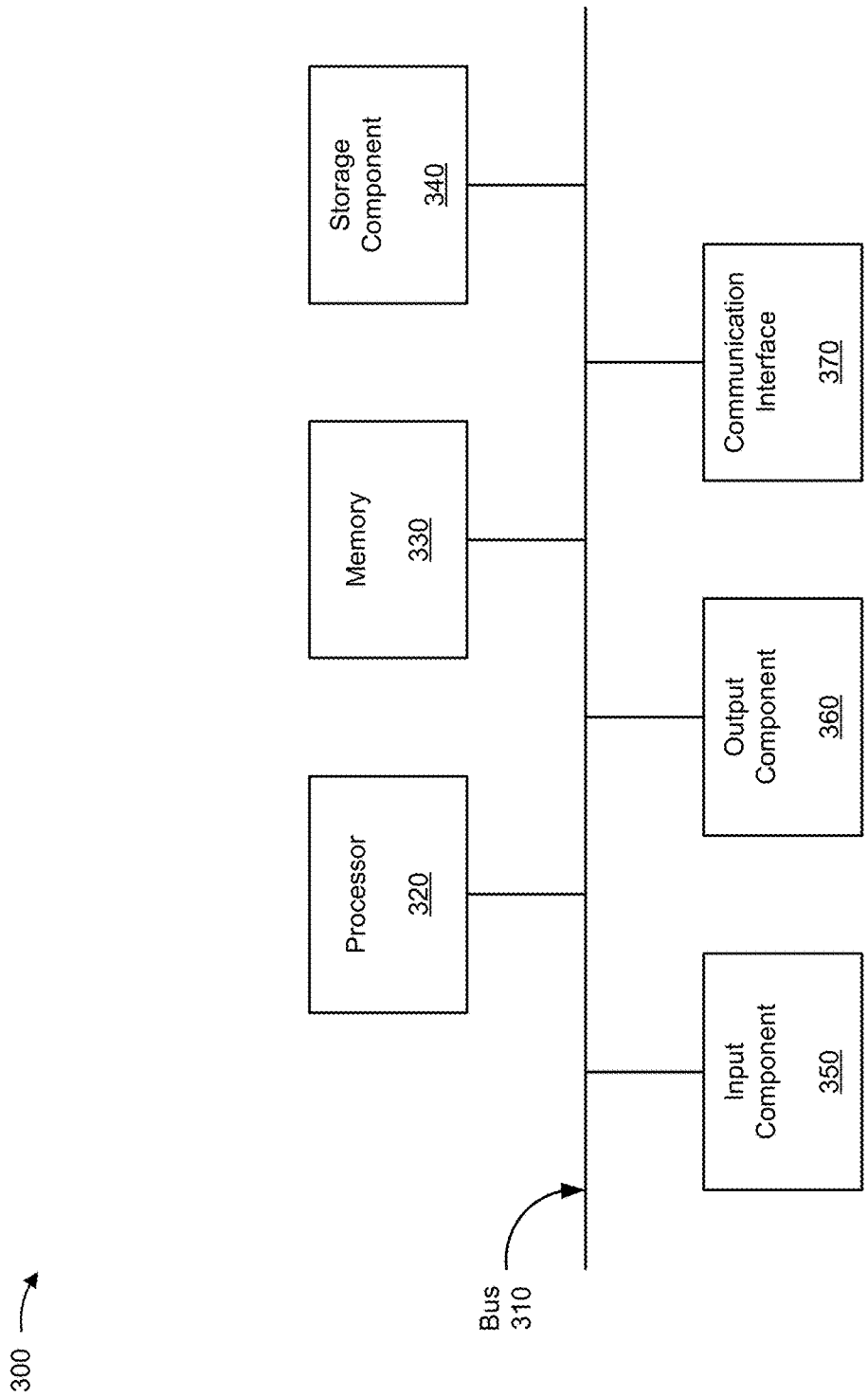
FIG. 3 is a diagram of example components of one or more devices of FIG. 2.

FIG. 3 is a diagram of example components of a device 300. Device 300 can correspond to TCP receiver 205, base station 210, MME 215, SGW 220, PGW 225, HSS/AAA 230, and/or TCP sender 235. In some implementations, TCP receiver 205, base station 210, MME 215, SGW 220, PGW 225, HSS/AAA 230 and/or TCP sender 235 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for maximizing throughput over a TCP link by boosting a congestion window (CWND) value of a TCP sender and a receive window buffer (RWIN) of a TCP receiver. In some implementations, one or more process blocks of FIG. 4 can be performed by TCP sender 235. In some implementations, one or more process blocks of FIG. 4 can be performed by another device or a group of devices separate from or including TCP sender 235, such as TCP receiver 205, base station 210, MME 215, SGW 220, PGW 225, or HSS/AAA 230.

As shown in FIG. 4, process 400 can include transmitting, to a TCP receiver, a quantity of packets based on a congestion window (CWND) value (block 410). For example, TCP sender 235 can determine a CWND value, and can use the CWND value to determine a quantity of packets to transmit to TCP receiver 205. In some implementations, TCP sender 235 can implement a TCP congestion-avoidance algorithm to prevent a TCP flow (e.g., a TCP connection between TCP sender 235 and TCP receiver 205) from becoming overloaded with network traffic, and the TCP congestion-avoidance algorithm can use the CWND value to limit a quantity of packets that TCP sender 235 can transmit within the TCP flow. As used herein, a packet can refer to a communication structure for communicating information, such as a protocol data unit (PDU), a network packet, a frame, a datagram, a segment, a message, a block, a cell, a subframe, a slot, a symbol, a portion of any of the above, and/or another type of formatted or unformatted unit of data capable of being transmitted via a network.

In some implementations, TCP sender 235 can determine a CWND value based on information exchanged when a TCP flow is initially established. For example, during a "three-way-handshake" process (e.g., which includes a SYN message, a SYN-ACK message, and an ACK message), TCP sender 235 and TCP receiver 205 can determine a maximum segment size (MSS), and the CWND value can be set based on the MSS, such as a multiple of the MSS value, as a particular MSS value, as an average of multiple received MSS values, or the like. In this case, TCP sender 235 can use the CWND value to determine the quantity of packets to transmit to TCP receiver 205. In this way, TCP sender 235 is able use information exchanged while establishing the TCP flow to set the CWND value.

As further shown in FIG. 4, process 400 can include receiving, from the TCP receiver, a quantity of acknowledgement (ACK) packets that include a corresponding quantity of advertised receive window (RWND) values, based on transmitting the quantity of packets (block 420). For example, TCP sender 235 can receive a quantity of ACK packets, where an ACK packet, of the quantity of ACK packets, includes an RWND value (e.g., in a header of the ACK packet). The RWND value can indicate an amount of data available in a receiving window buffer (RWIN) of TCP receiver 205, and TCP sender 235 can use the RWND value as a limit on an amount of data that TCP sender 235 can transmit at a particular time.

In some implementations, TCP sender 235 can store RWND values included in the ACK packets. For example, assume TCP sender 235 transmits a quantity of packets (e.g., ten packets) to TCP receiver 235, and that TCP receiver 235 transmits a quantity of ACK packets (e.g., ten ACK packets) to TCP sender 235. In this case, each ACK packet can include an RWND value, and TCP sender 235 can store the RWND values (e.g., ten RWND values) in a data structure. By storing the RWND values associated with the ACK packets, TCP sender 235 can use the RWND values to make more intelligent determinations on the quantity of packets to transmit on subsequent TCP flow transmissions, thereby improving network performance.

As further shown in FIG. 4, process 400 can include determining a maximum value for an updated CWND based on the CWND value and the corresponding quantity of RWND values (block 430). For example, TCP sender 235 can determine a maximum value for an updated CWND by comparing the CWND value and the corresponding quantity of RWND values, and can determine the maximum value for the updated CWND based on the comparison. The updated CWND value can indicate a maximum quantity of packets "in flight" that TCP sender 235 can transmit to TCP receiver 205. Packets "in flight" can refer to a quantity of packets that can be sent without receiving an ACK packet.

In some implementations, TCP sender 235 can determine the maximum value for the updated CWND by comparing the CWND value and the corresponding RWND values. For example, TCP sender 235 can access a data structure that stores the CWND value and the corresponding RWND values, and can compare the stored values to determine the greatest value. In this case, TCP sender 235 can set the greatest value among the CWND value and the corresponding quantity of RWND values as the updated CWND value.

In some implementations, TCP sender 235 can determine that an RWND value, of the corresponding quantity of RWND values, is a maximum value for the updated CWND. As an example, assume TCP sender 235 sets a CWND to two packets, and further assume that TCP receiver 205 transmits two ACK packets, that identify RWND values of 60 packets and 59 packets, respectively. Here, TCP sender 235 can compare the CWND value (e.g., two packets) and the RWND values (e.g., 60 packets and 59 packets), and can set the updated CWND value to a value equal to the largest of the CWND and RWND values (e.g., the RWND value of 60 packets).

In some implementations, TPC sender 235 can determine that the maximum value for the updated CWND is the CWND value. As an example, assume a congestion-avoidance algorithm is in a fourth iteration, and TCP sender 235 sets a CWND value of 1,000 packets (e.g., based on a RWND value included in one of the ACK packets). Further assume that TCP receiver 205 transmits 1,000 ACK packets, and that the highest RWND value included in the 1,000 ACK packets is a value of 750 packets. In this case, TCP sender 235 can compare the CWND value (e.g., 1,000 packets) and the RWND values (e.g., the highest of which is 750 packets), and can use the CWND value as the updated CWND value (e.g., 1,000 packets).

By setting the updated CWND to the maximum value associated with the CWND value and the RWND values, TCP sender 235 is able to increase a rate at which packets are provided to TCP receiver 205, which causes throughput over the TCP flow to increase.

As further shown in FIG. 4, process 400 can include providing a quantity of additional packets, to the TCP receiver, based on the maximum value determined for the updated CWND (block 440). For example, TCP sender 235 can provide a quantity of additional packets to TCP receiver 205, and the quantity of additional packets can be greater than, or equal to, the quantity of packets transmitted based on the CWND value (e.g., the quantity of packets transmitted during the previous iteration of the congestion-avoidance algorithm).

In some implementations, TCP sender 235 can provide a quantity of additional packets that is greater than the quantity of packets transmitted based on the CWND value. For example, assume the largest RWND value is greater than the CWND value, and that TCP sender 235 sets the maximum value of the updated CWND to a value equal to the largest RWND value. This can cause the quantity of additional packets transmitted to be larger than the quantity of packets transmitted in association with the CWND value. By using the largest RWND value to increase the amount of packets transmitted to TCP receiver 205, TCP sender 235 maximizes utilization of the TCP flow, thereby improving network performance.

In some cases, TCP sender 235 can provide a quantity of additional packets that is greater than the quantity of packets transmitted based on the CWND value, and this can trigger TCP receiver 205 to increase a size of the RWIN (e.g., double a size of the RWIN) unless a maximum socket RWIN size has been reached. For example, TCP receiver 205 can compare the RWIN and the maximum socket RWIN size, and can increase (e.g., double) the size of the RWIN if the RWIN can be increased (e.g., doubled) without surpassing the maximum socket RWIN size. In this case, TCP receiver 205 can transmit, to TCP sender 235, a quantity of additional ACK packets, that include a corresponding quantity of additional RWND values, and the corresponding quantity of additional RWND values can be based on the TCP receiver doubling the size of the RWIN. By increasing both the updated CWND value and the RWIN, TCP sender 235 and TCP receiver 205 are able to increase throughput levels within the TCP flow, which improves network performance.

In some implementations, TCP sender 235 can provide a quantity of packets equal to the quantity of packets transmitted based on the CWND value. For example, assume the CWND value is greater than the largest RWND value, and that TCP sender 235 uses the CWND value as the maximum value for the updated CWND. This can cause the quantity of additional packets transmitted to be equal to the quantity of packets transmitted in association with the CWND value. By maintaining the same CWND value when the CWND value is greater than the largest RWND value, TCP sender 235 minimizes packet loss by preventing the rate at which packets are transmitted within the TCP flow from continuing to increase (e.g., which can give TCP receiver 205 additional time to process packets that are already stored with the RWIN) and overflow the RWIN.

In some implementations, TCP sender 235 can determine whether the CWND value satisfies a slow start threshold. For example, TCP sender 235 can determine whether the CWND value satisfies the slow start threshold by comparing the CWND value and a value indicating a slow start threshold. If the slow start threshold is satisfied, TCP sender 235 can set the CWND value to a minimum of the CWND value and the RWND value. By updating the CWND value to the minimum of the CWND value and the RWND value when the slow start threshold is satisfied, TCP sender 235 efficiently manages network congestion and prevents the TCP link from becoming unstable.

Additionally, or alternatively, TCP sender 235 can determine whether the CWND value satisfies a time threshold. For example, TCP sender 235 can determine whether the CWND value satisfies the time threshold by comparing the CWND value and a value indicating a time threshold. If the time threshold is satisfied, TCP sender 235 can set the CWND value to a minimum of the CWND value and the RWND value. By updating the CWND value to the minimum of the CWND value and the RWND value when the time threshold is satisfied, TCP sender 235 efficiently manages network congestion and prevents the TCP link from becoming unstable.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

By setting the CWND value to the maximum RWND value received by an ACK packet, TCP sender 235 efficiently utilizes the RWIN of TCP receiver 205 by providing enough packets to maximize use of the RWIN on the next transmission. In this way, TCP sender 235 causes TCP receiver 205 to increase the RWIN to create additional buffer space, without overflowing the RWIN. Furthermore, increasing the CWND value and the RWIN can increase overall throughput over the TCP link.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below might directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
   transmit, to a transmission control protocol (TCP) receiver, a quantity of packets based on a congestion window (CWND) value;
   receive, from the TCP receiver, a quantity of acknowledgement (ACK) packets, that include a corresponding quantity of advertised receive window (RWND) values, based on transmitting the quantity of packets;
   determine a maximum value for an updated CWND based on the CWND value and the corresponding quantity of RWND values; and
   provide a quantity of additional packets, to the TCP receiver, based on the maximum value for the updated CWND to cause the TCP receiver to selectively increase a size of a receive buffer.

2. The device of claim 1, where the one or more processors are further to:
   receive, from the TCP receiver, a quantity of additional ACK packets, that include a corresponding quantity of additional RWND values,
      the corresponding quantity of additional RWND values to be based on the TCP receiver increasing the size of the receive buffer; and
   determine a new CWND value based on the maximum value for the updated CWND and the corresponding quantity of additional RWND values.

3. The device of claim 1, where the one or more processors, when determining the maximum value for the updated CWND, are to:
   compare the CWND value and the corresponding quantity of RWND values;
   determine a greatest value among the CWND value and the corresponding quantity of RWND values based on comparing the CWND value and the corresponding quantity of RWND values; and
   set the maximum value for the updated CWND to the greatest value.

4. The device of claim 1, where the one or more processors, when determining the maximum value for the updated CWND, are to:
   compare the CWND value and the corresponding quantity of RWND values;
   determine that an RWND value, of the corresponding quantity of RWND values, is a greatest value among the CWND value and the corresponding quantity of RWND values based on comparing the CWND value and the corresponding quantity of RWND values; and
   set the maximum value for the updated CWND to a value equal to the RWND value.

5. The device of claim 4, where the quantity of additional packets, associated with the maximum value for updated CWND, is greater than the quantity of packets transmitted based on the CWND value.

6. The device of claim 1, where the one or more processors, when determining the maximum value for the updated CWND, are to:
   compare the CWND value and the corresponding quantity of RWND values; and
   determine that the CWND value is a greatest value among the CWND value and the corresponding quantity of RWND values based on comparing the CWND value and the corresponding quantity of RWND values; and
   set or maintain the maximum value for the updated CWND to a value equal to the CWND value.

7. The device of claim 6, where the quantity of additional packets, associated with the maximum value for the updated CWND, is equal to the quantity of packets transmitted based on the CWND value.

8. A non-transitory computer-readable medium storing instructions, the instructions comprising:
   one or more instructions that, when executed by one or more processors, cause the one or more processors to:
      determine a congestion window (CWND) value for a transmission control protocol (TCP) flow;
      transmit, to a TCP receiver, a quantity of packets based on the CWND value;
      receive, from the TCP receiver, a quantity of acknowledgement (ACK) packets, that include a corresponding quantity of advertised receive window (RWND) values, based on transmitting the quantity of packets;
      determine an updated CWND value based on the CWND value and the corresponding quantity of RWND values; and
      provide a quantity of additional packets, to the TCP receiver, based on the updated CWND value to cause the TCP receiver to selectively increase a size of a receive buffer.

9. The non-transitory computer-readable medium of claim 8, where the one or more instructions, when executed by the one or more processors, further cause the one or more processors to:
   receive, from the TCP receiver, a quantity of additional ACK packets, that include a corresponding quantity of additional RWND values,
      the corresponding quantity of additional RWND values to be based on the TCP receiver increasing the size of the receive buffer;
   determine a new CWND value based on the updated CWND value and the corresponding quantity of additional RWND values; and
   provide, to the TCP receiver, another quantity of additional packets based on the new CWND value,
      the other quantity of additional packets being different from the quantity of additional packets.

10. The non-transitory computer-readable medium of claim 8, where the one or more instructions, that cause the one or more processors to determine the updated CWND value, cause the one or more processors to:
   compare the CWND value and the corresponding quantity of RWND values; and
   determine the updated CWND value based on comparing the CWND value and the corresponding quantity of RWND values.

11. The non-transitory computer-readable medium of claim 8, where the one or more instructions, that cause the one or more processors to determine the updated CWND value, cause the one or more processors to:
   compare the CWND value and the corresponding quantity of RWND values,
   determine that an RWND value, of the corresponding quantity of RWND values, is a maximum value, among the CWND value and the corresponding quantity of RWND values, based on comparing the CWND value and the corresponding quantity of RWND values; and where the one or more instructions, that cause the one or more processors to determine the updated CWND value, cause the one or more processors to:
set the updated CWND value to a value equal to the RWND value.

12. The non-transitory computer-readable medium of claim 11, where the quantity of additional packets associated with the updated CWND value is greater than the quantity of packets transmitted based on the CWND value.

13. The non-transitory computer-readable medium of claim 8, where the one or more instructions, that cause the one or more processors to determine the updated CWND value, cause the one or more processors to:
compare the CWND value and the corresponding quantity of RWND values, and
determine that the CWND value is a greatest value among the CWND value and the corresponding quantity of RWND values based on comparing the CWND value and the corresponding quantity of RWND values; and
set the updated CWND value to a value equal to the CWND value.

14. The non-transitory computer-readable medium of claim 8, where increasing a rate at which the additional packets are provided to the TCP receiver causes throughput over the TCP flow to increase.

15. A method, comprising:
transmitting, by a device and to a transmission control protocol (TCP) receiver, a quantity of packets based on a congestion window (CWND) value;
receiving, by the device and from the TCP receiver, a quantity of acknowledgement (ACK) packets, that include a corresponding quantity of advertised receive window (RWND) values, based on transmitting the quantity of packets;
determining, by the device, an updated CWND value as a maximum of the CWND value and the corresponding quantity of RWND values; and
providing, by the device, a quantity of additional packets, to the TCP receiver, based on the updated CWND value to cause the TCP receiver to selectively increase a size of a receive buffer associated with a TCP flow involving the device and the TCP receiver.

16. The method of claim 15, further comprising:
receiving, from the TCP receiver, a quantity of additional ACK packets that include a corresponding quantity of additional RWND values,
the corresponding quantity of additional RWND values to be based on the TCP receiver increasing the size of the receive buffer;
determining a new CWND value as a maximum of the updated CWND value and the corresponding quantity of additional RWND values; and
providing, to the TCP receiver, another quantity of additional packets, based on the new CWND value.

17. The method of claim 15, where determining the updated CWND value comprises:
comparing the CWND value and the corresponding quantity of RWND values, and
determining the updated CWND value, as the maximum of the CWND value and the corresponding quantity of RWND values, based on comparing the CWND value and the corresponding quantity of RWND values.

18. The method of claim 15, where determining the updated CWND value comprises:
determining that an RWND value, of the corresponding quantity of RWND values, is a maximum value among the CWND value and the corresponding quantity of RWND values; and
where determining the updated CWND value comprises:
setting the updated CWND value to a value equal to the RWND value.

19. The method of claim 15, where the quantity of additional packets is greater than the quantity of packets transmitted based on the CWND value.

20. The method of claim 15, where determining the updated CWND value comprises:
determining that the CWND value is a maximum value among the CWND value and the corresponding quantity of RWND values; and
where determining the updated CWND value comprises:
using the CWND value as the updated CWND value.

* * * * *